United States Patent
Yao et al.

(10) Patent No.: US 12,378,403 B2
(45) Date of Patent: Aug. 5, 2025

(54) RESIN COMPOSITION AND RESIN MOLDED BODY

(71) Applicant: FUJIFILM BUSINESS INNOVATION CORP., Tokyo (JP)

(72) Inventors: Kenji Yao, Kanagawa (JP); Yuko Iwadate, Kanagawa (JP); Satomi Kashiwagi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 399 days.

(21) Appl. No.: 17/984,871

(22) Filed: Nov. 10, 2022

(65) Prior Publication Data

US 2023/0407084 A1 Dec. 21, 2023

(30) Foreign Application Priority Data

Jun. 21, 2022 (JP) .................................. 2022-099834

(51) Int. Cl.
*C08L 67/04* (2006.01)
*C08L 1/12* (2006.01)
*C08L 1/14* (2006.01)

(52) U.S. Cl.
CPC ................. *C08L 67/04* (2013.01); *C08L 1/12* (2013.01); *C08L 1/14* (2013.01); C08L 2201/06 (2013.01); C08L 2205/18 (2013.01)

(58) Field of Classification Search
CPC . C08K 2201/013; C08K 7/16; C08L 2201/06; C08L 67/04
See application file for complete search history.

(56) References Cited

U.S. PATENT DOCUMENTS

2024/0041710 A1* 2/2024 Abe .......................... A61K 8/25

FOREIGN PATENT DOCUMENTS

| JP | H11-241009 A | 9/1999 | |
|---|---|---|---|
| JP | 2010-270289 A | 12/2010 | |
| JP | 2021191845 A * | 12/2021 | .............. C08L 67/00 |

OTHER PUBLICATIONS

Espace Translation of JP2021191845 Specification (Year: 2021).*
Biomer P226 Datasheet Snapshot. Snapshot from Wayback Machine from Jun. 20, 2021, available at: https://web.archive.org/web/20210620122008/https://omnexus.specialchem.com/product/t-biomer-biomer-p226 (Year: 2021).*

* cited by examiner

*Primary Examiner* — Randy P Gulakowski
*Assistant Examiner* — Virginia L Stonehocker
(74) *Attorney, Agent, or Firm* — Oliff PLC

(57) ABSTRACT

A resin composition contains a biodegradable resin and cellulose particles that have a sphericity of 0.9 or more.

16 Claims, No Drawings

RESIN COMPOSITION AND RESIN MOLDED BODY

CROSS-REFERENCE TO RELATED APPLICATIONS

This application is based on and claims priority under 35 USC 119 from Japanese Patent Application No. 2022-099834 filed Jun. 21, 2022.

BACKGROUND

(i) Technical Field

The present disclosure relates to a resin composition and a resin molded body.

(ii) Related Art

Japanese Unexamined Patent Application Publication No. 2010-270289 proposes a "biodegradable resin composition containing a biodegradable resin and cellulose having a crystallinity of less than 50%".

Japanese Unexamined Patent Application Publication No. 11-241009 proposes a "polylactic resin composition containing a polymer component (A) containing a polylactic acid (a1) and a biodegradable aliphatic polyester (a2) having a melting point of 50 to 250° C., in which, with respect to a total weight of the polylactic acid (a1) and the aliphatic polyester (a2), 90 to 50 wt % of the polylactic acid (a1) and 10 to 50 wt % of the aliphatic polyester (a2) are contained, and, relative to 100 parts by weight of the polymer component (A), 0.1 to 100 parts by weight of a biodegradable natural product (B) is contained in the polylactic resin composition".

SUMMARY

Aspects of non-limiting embodiments of the present disclosure relate to a resin composition that contains a biodegradable resin and cellulose particles and that have high biodegradability and heat resistance compared to when the cellulose particles have a sphericity of less than 0.9 or when the resin composition has a crystallinity of less than 60%.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a resin composition that contains a biodegradable resin and cellulose particles having a sphericity of 0.9 or more.

DETAILED DESCRIPTION

Exemplary embodiments of the present disclosure will now be described. These descriptions and examples are exemplary embodiments and do not limit the scope of the disclosure.

In numerical ranges described stepwise in this description, the upper limit or the lower limit of one numerical range may be substituted with an upper limit or a lower limit of a different numerical range also described stepwise. Furthermore, in any numerical range described in this description, the upper limit or the lower limit of the numerical range may be substituted with a value indicated in Examples.

Each of the components may contain more than one corresponding substances.

When the amount of any component in a composition is described and when there are more than one substances that correspond to that component in the composition, the amount of the component is the total amount of the more than one corresponding substances present in the composition unless otherwise noted.

Resin Composition

A resin composition according to a first exemplary embodiment contains a biodegradable resin and cellulose particles, and the cellulose particles have a sphericity of 0.9 or more.

A resin composition according to the first exemplary embodiment exhibits improved biodegradability and heat resistance due to the aforementioned features. The reason for this is presumably as follows.

In recent years, there has been growing interest in biodegradable resins in tackling environmental issues such as SDGs. Biodegradable resins do not exhibit sufficient biodegradation rate in every environment, and insufficient biodegradability and poor heat resistance have imposed limits on the usage of the biodegradable resins. The heat resistance may improve when a resin composition contains a biodegradable resin and a petroleum resin or the like, but biodegradability thereof tends to be low.

The resin composition according to the first exemplary embodiment contains a biodegradable resin and cellulose particles. In addition, the cellulose particles have a sphericity of 0.9 or more. During the manufacture of the resin composition of the first exemplary embodiment, the cellulose particles easily disperse nearly evenly in the resin composition. Thus, in the resin composition of the first exemplary embodiment, it is easy to have the cellulose particles disperse evenly.

The cellulose particles have a high biodegradation rate. Thus, during biodegradation of the resin composition, biodegradation of cellulose particles occurs preferentially. As a result, due to the even distribution of the cellulose particles, the microorganisms, degrading enzymes, and the like that cause biodegradation easily spread throughout the resin composition, and thus the biodegradability of the resin composition as a whole is improved.

Moreover, during the manufacture of the resin composition of the first exemplary embodiment, the cellulose particles act as nuclei and promote crystallization of the biodegradable resin. Thus, the crystallinity of the resin composition of the first exemplary embodiment tends to be high. Increasing the crystallinity also improves the heat resistance of the resin composition.

Presumably due to these features, the resin composition according to the first exemplary embodiment exhibits improved biodegradability and heat resistance.

A resin composition according to a second exemplary embodiment contains a biodegradable resin and cellulose particles, and has a crystallinity of 60% or more.

The resin composition according to the second exemplary embodiment exhibits improved biodegradability and heat resistance due to the aforementioned features. The reason for this is presumably as follows.

The resin composition according to the second exemplary embodiment contains a biodegradable resin and cellulose particles.

Since the cellulose particles have a high biodegradation rate, during biodegradation of the resin composition, biodegradation of the cellulose particles occurs preferentially. As a result, the microorganisms, degrading enzymes, and the like that cause biodegradation easily spread throughout the resin composition, and thus the biodegradability of the resin composition as a whole is improved.

The resin composition according to the second exemplary embodiment has a crystallinity of 60% or more. When the crystallinity is in this range, the heat resistance of the resin composition is also improved.

Presumably due to these features, the resin composition according to the second exemplary embodiment exhibits improved biodegradability and heat resistance.

Hereinafter, a resin composition that corresponds to both the first and second exemplary embodiments is described in detail. However, an example of the resin composition of the present disclosure is any resin composition that corresponds to one of the first and second exemplary embodiments.

Biodegradable Resin

A biodegradable resin is a resin that decomposes into water and carbon dioxide by microorganisms, and is a resin other than cellulose. Specifically, a biodegradable resin refers to a resin that has an aerobic biodegradability of 50% or more in 12 months as measured by a method according to ISO-14855-2 (2018).

Examples of the biodegradable resin include cellulose acylates, polyesters, and natural polymers.

Cellulose acylate is a cellulose derivative obtained by substituting at least one hydroxy group in cellulose with an acyl group (acylation). The acyl group is a group that has a structure represented by —CO—$R^{AC}$ (where $R^{AC}$ represents a hydrogen atom or a hydrocarbon group). Examples of cellulose acylate include cellulose derivatives represented by general formula (CA) below.

Examples of polyesters include aliphatic polyesters and aliphatic-aromatic polyesters.

An example of the aliphatic polyesters is a polyhydroxyalkanoate.

Examples of the aliphatic-aromatic polyesters include polybutylene adipate/terephthalate copolymer resins (PBAT) and polytetramethylene adipate/terephthalate copolymer resins.

Examples of the natural polymers include starch, chitin, chitosan, gluten, gelatin, zein, soy protein, collagen, and keratin.

The biodegradable resin may contain at least one selected from the group consisting of polyhydroxyalkanoates and cellulose acylates.

When the biodegradable resin contains at least one selected from the group consisting of polyhydroxyalkanoates and cellulose acylates, the biodegradability and the heat resistance of the resin composition are enhanced. This is presumably because polyhydroxyalkanoates and cellulose acylates have high affinity with the cellulose particles, and thus further improve the dispersibility of the cellulose particles.

The biodegradable resins may be used alone or in combination; however, from the viewpoint of improving the biodegradability and heat resistance, one biodegradable resin may be used alone.

Polyhydroxyalkanoate

A polyhydroxyalkanoate is a polymer of hydroxyalkanoic acid.

Examples of the polyhydroxyalkanoate include compounds having a structural unit represented by general formula (PHA).

In a compound having a structural unit represented by general formula (PHA), one or both of polymer chain terminals (main chain terminals) may be carboxyl groups, or one terminal may be a carboxyl group and the other terminal may be a different group (for example, a hydroxyl group).

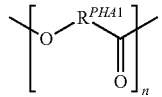

General formula (PHA)

In general formula (PHA), $R^{PHA1}$ represents an alkylene group having 1 to 10 carbon atoms. n represents an integer of 2 or more.

In general formula (PHA), the alkylene group represented by $R^{PHA1}$ may have 2 to 6 carbon atoms. The alkylene group represented by $R^{PHA1}$ may be linear or branched, but is preferably branched.

Here, the phrase "$R^{PHA1}$ in general formula (PHA) represents an alkylene group" indicates one of the following two structures: 1) an [O—$R^{PHA1}$—C(=O)—] structure where all of $R^{PHA1}$ groups represent the same alkylene group; and 2) multiple [O—$R^{PHA1}$—C(=O)—] structures where $R^{PHA1}$ groups represent different alkylene groups ($R^{PHA1}$ groups represent alkylene groups having different numbers of carbon atoms and/or different branching) (in other words, an [O—$R^{PHA1A}$—C(=O)—][O—$R^{PHA1B}$—C(=O)—] structure).

In other words, the polyhydroxyalkanoate may be a homopolymer of one hydroxyalkanoic acid, or a copolymer of two or more hydroxyalkanoic acids.

In general formula (PHA), the upper limit of n is not particularly limited, and may be, for example, 20000 or less. The range of n is preferably 500 or more and 10000 or less, and more preferably 1000 or more and 8000 or less.

Examples of the polyhydroxyalkanoate include homopolymers of a hydroxyalkanoic acid (lactic acid, 2-hydroxybutyric acid, 3-hydroxybutyric acid, 4-hydroxybutyric acid, 2-hydroxy-3-methylbutyric acid, 2-hydroxy-3,3-dimethylbutyric acid, 3-hydroxyvaleric acid, 4-hydroxyvaleric acid, 5-hydroxyvaleric acid, 3-hydroxyhexanoic acid, 2-hydroxyhexanoic acid, 2-hydroxyisohexanoic acid, 6-hydroxyhexanoic acid, 3-hydroxypropionic acid, 3-hydroxy-2,2-dimethylpropionic acid, or 2-hydroxy-n-octanoic acid) or copolymers of two or more of these hydroxyalkanoic acids.

From the viewpoint improving the biodegradability and heat resistance, the polyhydroxyalkanoate is preferably a homopolymer of lactic acid (in other words, polylactic acid), a homopolymer of 3-hydroxybutyric acid, or a copolymer of 3-hydroxybutyric acid and 3-hydroxyhexanoic acid, and is more preferably a homopolymer of lactic acid.

When polylactic acid is used as the polyhydroxyalkanoate, the biodegradability and heat resistance of the resin composition are further enhanced. This is probably because polylactic acid has particularly high affinity with the cellulose particles, and thus further improves the dispersibility of the cellulose particles.

These polyhydroxyalkanoates (A) may be used alone or in combination.

Cellulose Acylate

Examples of cellulose acylate include cellulose derivatives represented by general formula (CA) below.

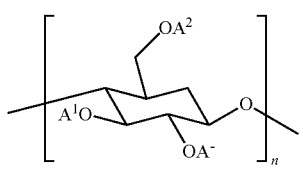

General formula (CA)

In general formula (CA), A1, A2, and A3 each independently represent a hydrogen atom or an acyl group, and n represents an integer of 2 or more. However, among n A1 groups, n A2 groups, and n A3 groups, at least one group represents an acyl group. The n A1 groups in the molecule may be all the same, may be partially the same, or may be different from one another. The same applies to the n A2 groups and the n A3 groups in the molecule.

The acyl group represented by A1, A2, and A3 may have a linear, branched, or cyclic hydrocarbon group, preferably has a linear or branched hydrocarbon group, and yet more preferably has a linear hydrocarbon group.

The acyl group represented by A1, A2, and A3 may have a saturated hydrocarbon group or unsaturated hydrocarbon group, but preferably has a saturated hydrocarbon group.

The acyl group represented by A1, A2, and A3 may have 1 to 6 carbon atoms. In other words, the cellulose acylate may have an acyl group having 1 to 6 carbon atoms.

The acyl group represented by A1, A2, and A3 may have a hydrogen atom substituted with a halogen atom (for example, a fluorine atom, a bromine atom, or an iodine atom), an oxygen atom, a nitrogen atom, or the like, but is preferably unsubstituted.

Examples of the acyl group represented by A1, A2, and A3 include a formyl group, an acetyl group, a propionyl group, a butyryl group (butanoyl group), a propenoyl group, and a hexanoyl group. Among these, from the viewpoint of improving the biodegradation rate, an acyl group having 2 to 4 carbon atoms is more preferable, and an acyl group having 2 or 3 carbon atoms is yet more preferable.

Examples of the cellulose acylate include cellulose acetates (cellulose monoacetate, cellulose diacetate (DAC), and cellulose triacetate), cellulose acetate propionate (CAP), and cellulose acetate butyrate (CAB).

These cellulose acylates may be used alone or in combination.

The weight-average degree of polymerization of the cellulose acylate is preferably 200 or more and 1000 or less, more preferably 500 or more and 1000 or less, and yet more preferably 600 or more and 1000 or less.

The weight-average degree of polymerization of the cellulose acylate is determined from the weight-average molecular weight (Mw) by the following procedure.

First, the weight-average molecular weight (Mw) of the cellulose acylate is measured as a polystyrene equivalent using tetrahydrofuran and a gel permeation chromatograph (GPC device: HLC-8320GPC produced by TOSOH CORPORATION, column: TSKgelα-M).

Next, the obtained molecular weight is divided by the molecular weight of the constituting unit of the cellulose acylate to determine the degree of polymerization of the cellulose acylate. For example, when the substituent of the cellulose acylate is an acetyl group, the molecular weight of the constituting unit is 263 when the degree of substitution is 2.4 and is 284 when the degree of substitution is 2.9.

The degree of substitution of the cellulose acylate is preferably 1.5 or more and 2.9 or less, more preferably 1.7 or more and 2.9 or less, yet more preferably 1.9 or more and 2.9 or less, and particularly preferably 2.1 or more and 2.9 or less from the viewpoint of balancing the moldability, mechanical strength, and improving the biodegradation rate.

In cellulose acetate propionate (CAP), the ratio (acetyl group/propionyl group) of the degree of substitution of the acetyl group to the propionyl group is preferably 0.01 or more and 1 or less and more preferably 0.05 or more and 0.1 or less from the viewpoint of improving the biodegradation rate.

In cellulose acetate butyrate (CAB), the ratio (acetyl group/butyryl group) of the degree of substitution of the acetyl group to the butyryl group is preferably 0.05 or more and 3.5 or less and more preferably 0.5 or more and 3.0 or less from the viewpoint of improving the biodegradation rate.

The degree of substitution of cellulose acylate is an indicator of the degree in which the hydroxy groups in the cellulose are substituted with acyl groups. In other words, the degree of substitution is an indicator of the extent of acylation of the cellulose acylate. Specifically, the degree of substitution refers to the intramolecular average of how many of the three hydroxy groups present in D-glucopyranose unit of the cellulose acylate are substituted with acyl groups. The degree of substitution is determined from the integrated ratio of the peak of the cellulose-derived hydrogen and the peak of the acyl group-derived hydrogen by 1H-NMR (JMN-ECA produced by JEOL RESONANCE Ltd.).

These biodegradable resins may be used alone or in combination.

Cellulose Particles

The cellulose particles are particles containing cellulose as a main component.

Containing cellulose as a main component means that the cellulose content in the cellulose particles is 90 mass % or more.

The sphericity of the cellulose particles is 0.9 or more, and from the viewpoints of improving biodegradability and heat resistance, the sphericity is preferably 0.93 or more, more preferably 0.95 or more, and yet more preferably 0.96 or more.

The sphericity of the cellulose particles is measured as follows.

To 900 g of chloroform, 100 g of the resin composition is added, and the resulting mixture is stirred to dissolve the biodegradable resin and then filtered to take out cellulose particles insoluble in chloroform. The taken-out cellulose particles are washed with water and dried at 50° C. for 4 hours.

The obtained cellulose particles are sampled by suction, allowed to form a flat flow, and imaged by instantaneous strobe light emission to capture particle images as still images; and then these particle images are analyzed by a flow-type particle image analyzer (FPIA-3000 produced by Sysmex Corporation) to determine the "perimeter of a circle having the same projected area as the particle image" and the "perimeter of the projected image of the particle". Then the sphericity is calculated from (Equation 1) below.

sphericity=(equivalent circle perimeter)/(perimeter)
[(perimeter of a circle having the same projection area as the particle image)/(perimeter of projected image of particle)] (Equation 1):

The average particle diameter of the cellulose particles is preferably 1 μm or more and less than 10 μm, more preferably 1 μm or more and 5 μm or less, and yet more preferably 2 μm or more and 5 μm or less.

When the average particle diameter of the cellulose particles is in the aforementioned numerical range, the biodegradability and heat resistance of the resin composition are further enhanced. The reason for this is presumably as follows.

When the average particle diameter of the cellulose particles is 1 μm or more, aggregation of the cellulose particles in the resin composition is reduced, and thus the dispersibility of the cellulose particles is enhanced.

When the average particle diameter of the cellulose particles is less than 10 μm, the filling fraction of the cellulose particles in the resin composition tends to be high.

When the average particle diameter of the cellulose particles is 5 μm or less, the filling fraction of the cellulose particles in the resin composition can be more easily increased.

The average particle diameter of the cellulose particles is measured as follows.

To 900 g of chloroform, 100 g of the resin composition is added, and the resulting mixture is stirred to dissolve the biodegradable resin and then filtered to take out cellulose particles insoluble in chloroform. The taken-out cellulose particles are washed with water and dried at 50° C. for 4 hours. The particle diameters of the obtained cellulose particles are measured with a laser diffraction-scattering particle size distribution analyzer (Microtrac MT3300EX produced by MicrotracBEL Corp.), the cumulative distribution of the particle diameters is plotted on a volume basis from the small diameter side, and the particle diameter at 50% cumulation is determined as the average particle diameter. In the measurement using the laser diffraction-scattering particle size distribution analyzer, methanol is used as the dispersing medium for the cellulose particles, and 0.2 g of the cellulose particles are added to carry out measurement.

The particle size distribution GSDv of the cellulose particles is preferably 1.7 or less, more preferably 1.6 or less, and yet more preferably 1.5 or less.

When the particle size distribution GSDv of the cellulose particles is 1.7 or less, the biodegradability and heat resistance of the resin composition are further enhanced. The reason for this is presumably as follows.

When the particle size distribution GSDv of the cellulose particles is 1.7 or less, particle diameters of the cellulose particles become more even, and the dispersibility of the cellulose particles in the resin composition is enhanced.

The particle size distribution GSDv of the cellulose particles is measured as follows.

To 900 g of chloroform, 100 g of the resin composition is added, and the resulting mixture is stirred to dissolve the biodegradable resin and then filtered to take out cellulose particles insoluble in chloroform. The taken-out cellulose particles are washed with water and dried at 50° C. for 4 hours. The particle diameters of the obtained cellulose particles are measured with an LS particle size distribution analyzer (Beckman Coulter LS13320 (produced by Beckman Coulter, Inc.)), the cumulative distribution of the particle diameters is plotted on a volume basis from the small diameter side, the particle diameter at 50% cumulation is defined as the number-average particle diameter D50v, and the particle diameter at 84% cumulation is defined as the number particle diameter D84v. Then the particle size distribution GSDv is calculated from (Equation 2).

$$GSDv = (D84v/D50v)^{1/2} \qquad \text{(Equation 2)}:$$

The surface smoothness of the cellulose particles is preferably 50% or more and 99% or less, more preferably 60% or more and 90% or less, and yet more preferably 70% or more and 85% or less.

When the surface smoothness of the cellulose particles is 50% or more and 99% or less, the biodegradability and heat resistance of the resin composition are further enhanced. The reason for this is presumably as follows.

When the surface smoothness of the cellulose particles is 99% or less, the surfaces of the cellulose particles have an appropriate degree of irregularities, and thus the contact area with the biodegradable resin is improved. Thus, as biodegradation of the cellulose particles proceeds, the microorganisms, degrading enzymes, etc., that cause biodegradation more easily spread throughout the resin composition. Thus, crystallization of the biodegradable resin is further accelerated.

When the surface smoothness of the cellulose particles is 50% or more, secondary aggregation of the cellulose particles caused by an excessively large specific surface area can be avoided, and more evenly dispersed cellulose particles in the resin composition improve the biodegradability and offer a heat resistance improving effect brought about by acceleration of crystallization.

The surface smoothness of the cellulose particles is measured as follows.

To 900 g of chloroform, 100 g of the resin composition is added, and the resulting mixture is stirred to dissolve the biodegradable resin and then filtered to take out cellulose particles insoluble in chloroform. The taken-out cellulose particles are washed with water and dried at 50° C. for 4 hours. The obtained cellulose particles are imaged with a scanning electron microscope (SEM) to obtain a SEM image (magnification: 5,000×) of the cellulose particles, and the smoothness M of each of the cellulose particles is calculated from (Equation 3) below. Next, the arithmetic average of the smoothness M of the arbitrarily selected 50 or more cellulose particles is assumed to be the surface smoothness. The closer the smoothness M is to 1, the smoother the surface of the cellulose particle.

$$M = (1 - (S3)/(S2)) \times 100 \qquad \text{(Equation 3)}:$$

In the equation above, S2 represents an area (projected area) of a cellulose particle in the image, and S3 represents a total of the "area outside a contour of a circle having the same projected area as S2 and inside the contour of the cellulose particle in the image" and the "area inside the contour of the circle having the same projected area as S2 and outside the contour of the cellulose particle in the image" when the cellulose particle in the image and the circle having the same projected area as S2 are superimposed on each other.

Here, the method for superimposing the cellulose particle in the image and the circle having the same projected area as S2 is as follows.

The cellulose particle in the image and the circle having the same projected area as S2 are superimposed in such a way that maximizes the area of the region where two images overlap (in other words, the area inside the contour of the circle having the same projected area as S2 and inside the contour of the cellulose particle in the image).

The number-average molecular weight of cellulose contained in the cellulose particles is preferably 37000 or more and yet more preferably 45000 or more.

The upper limit of the number-average molecular weight of cellulose may be any, and may be, for example, 100000 or less.

The number-average molecular weight of cellulose is measured by gel permeation chromatography (differential refractometer: Optilab T-rEX produced by Wyatt Technology Corporation, multiangle light scattering detector: DAWN HELEOS II produced by Wyatt Technology Corporation, columns: one TSKgel α-M and one α-3000 produced by TOSOH CORPORATION) with dimethylacetamide (0.1 M lithium chloride is added) as a solvent.

Coating Layer

The resin composition of the exemplary embodiment may have a coating layer that covers each of the cellulose particles, and the coating layer may contain at least one selected from the group consisting of linear saturated fatty acids, linear saturated fatty acid metal salts, and amino acid compounds.

The presence of the coating layer further enhances the biodegradability and heat resistance of the resin composition. The reason for this is presumably as follows.

The presence of the coating layer further improves the affinity between the biodegradable resin and the cellulose particles, and this further improves the dispersibility of the cellulose particles.

The mass of the coating layer relative to the entire cellulose particle may be 2 mass % or more and 10 mass % or less.

Linear Saturated Fatty Acid

A linear saturated fatty acid is a saturated fatty acid that has a linear structure.

From the viewpoint of the affinity with the biodegradable resin, the linear saturated fatty acid may have 14 to 22 carbon atoms.

Specific examples of the linear saturated fatty acid having 14 to 22 carbon atoms include behenic acid, stearic acid, arachidic acid, and palmitic acid.

Linear Saturated Fatty Acid Metal Salt

A linear saturated fatty acid metal salt is a metal salt of a linear saturated fatty acid.

The linear saturated fatty acid metal salt contains, as an anion, a carboxylate anion of a linear saturated fatty acid, and contains, as a cation, a metal ion.

The carboxylate anion contained in the linear saturated fatty acid metal salt may be a carboxylate anion of a linear saturated fatty acid applied in the aforementioned "Linear saturated fatty acid".

Examples of the metal ion contained in the linear saturated fatty acid metal salt include ions of alkali metals and ions of alkaline earth metals.

Examples of the metal ion include magnesium ions and calcium ions.

Examples of the linear saturated fatty acid metal salt include calcium stearate, calcium behenate, calcium arachidate, and calcium palmitate.

Amino Acid Compound

The amino acid compound is an amino acid or an amino acid derivative other than arginine compounds described below. Here, the amino acid compound does not include polypeptides.

An amino acid derivative is an amino acid that contains at least one substituent substituting a hydrogen atom contained in the amino acid. Examples of the substituent include hydrocarbon groups (specifically, an alkyl group and a phenyl group, for example).

The amino acid compound may be an amino acid derivative.

Examples of the amino acid compound include lauroyllysine and myristylleucine.

Intermediate Layer

The resin composition of the exemplary embodiment may have an intermediate layer between the cellulose particle surface and the coating layer, and the intermediate layer may contain at least one selected from the group consisting of arginine compounds and polyamine compounds.

The presence of the intermediate layer further enhances the biodegradability and heat resistance of the resin composition. The reason for this is presumably as follows.

The presence of the intermediate layer particularly improves the affinity between the biodegradable resin and the cellulose particles, and this further improves the dispersibility of the cellulose particles.

The mass of the intermediate layer relative to the entire cellulose particle may be 0.5 mass % or more and 5 mass % or less.

Arginine Compound

The arginine compound is arginine or an arginine derivative. Here, the arginine compound does not include polypeptides.

An arginine derivative is arginine that contains at least one substituent substituting a hydrogen atom contained in arginine. Examples of the substituent include hydrocarbon groups (specifically, an alkyl group and a phenyl group, for example).

The arginine compound may be arginine.

Polyamine Compound

In this description, the polyamine compound refers to a polymer that has an amino group-containing structural unit.

Examples of the polyamine compound include polyalkyleneimine, polyallylamine, polyvinylamine, polylysine, and PEG-15 cocopolyamine.

From the viewpoint of improving the biodegradability, polyalkyleneimine preferably has a structural unit that has an alkylene group having 1 to 6 carbon atoms (preferably 1 to 4 carbon atoms and more preferably 1 or 2 carbon atoms), and is more preferably polyethyleneimine.

Examples of the polyallylamine include homopolymers and copolymers of allylamine, allylamine amide sulfate, diallylamine, and dimethylallylamine.

One example of polyvinylamine is a substance obtained by hydrolysis of poly(N-vinylformamide) with an alkali, and a specific example is "PVAM-0595B" produced by Mitsubishi Chemical Corporation.

Polylysine may be extracted from a natural product, may be produced by a transforming microorganism, or may be chemically synthesized.

As PEG-15 cocopolyamine, Dehyquart H81 produced by BASF SE can be used, for example.

Cellulose Particle Content

The cellulose particle content relative to the entire resin composition is preferably 0.5 mass % or more and 34 mass % or less, more preferably 2 mass % or more and 30 mass % or less, and yet more preferably 3 mass % or more and 20 mass % or less.

When the cellulose particle content relative to the entire resin composition is 0.5 mass % or more and 34 mass % or less, the biodegradability and heat resistance of the resin composition are further enhanced. The reason for this is presumably as follows.

When the cellulose particle content relative to the entire resin composition is 0.5 mass % or more, the amount of the cellulose particles in the resin composition increases, and the cellulose particles can be easily dispersed throughout the resin composition. Thus, the biodegradability and heat resistance of the resin composition are further improved.

When the cellulose particle content relative to the entire resin composition is 34 mass % or less, the cellulose particle content falls within an appropriate range for moldability and secondary aggregation of the cellulose particles can be prevented; thus, the biodegradability and heat resistance are improved.

The ratio of the mass of the cellulose particles to the mass of the biodegradable resin (mass of cellulose particles/mass of biodegradable resin) is preferably 0.005 or more and 0.5 or less, more preferably 0.01 or more and 0.3 or less, and yet more preferably 0.03 or more and 0.2 or less.

When the ratio of the mass of the cellulose particles to the mass of the biodegradable resin (mass of cellulose particles/mass of biodegradable resin) is 0.005 or more and 0.5 or less, the biodegradability and heat resistance of the resin composition are further enhanced. The reason for this is presumably as follows.

When the ratio of the mass of the cellulose particles to the mass of the biodegradable resin (mass of cellulose particles/mass of biodegradable resin) is 0.005 or more, the amount of the cellulose particles relative to the biodegradable resin increases, and the cellulose particles can be easily dispersed throughout the resin composition. Thus, the biodegradability and heat resistance of the resin composition are further improved.

When the ratio of the mass of the cellulose particles to the mass of the biodegradable resin (mass of cellulose particles/mass of biodegradable resin) is 0.5 or less, the cellulose particle content falls within an appropriate range for moldability, and since secondary aggregation of the cellulose particles can be prevented, the biodegradability and heat resistance are improved.

Other Components

The resin composition of the exemplary embodiment may further contain other components.

Examples of other components include plasticizers, flame retardants, compatibilizers, release agents, light stabilizers, anti-weathering agents, colorants, pigments, modifiers, anti-drip agents, antistatic agents, anti-hydrolysis agents, fillers, reinforcing agents (glass fibers, carbon fibers, talc, clay, mica, glass flakes, milled glass, glass beads, crystalline silica, alumina, silicon nitride, aluminum nitride, boron nitride, etc.), acid acceptors for preventing acetic acid release (oxides such as magnesium oxide and aluminum oxide; metal hydroxides such as magnesium hydroxide, calcium hydroxide, aluminum hydroxide, and hydrotalcite; calcium carbonate; talc; etc.), and reactive trapping agents (for example, epoxy compounds, acid anhydride compounds, and carbodiimides).

The content of each of these other components relative to the entire resin composition may be 0 mass % or more and 5 mass % or less. Here, "0 mass %" means that that component is not contained.

Crystallinity

The resin composition according to the exemplary embodiment has a crystallinity of 60% or more.

From the viewpoint of the heat resistance, the crystallinity is preferably 65% or more, more preferably 70% or more, and yet more preferably 75% or more.

The resin composition according to the exemplary embodiment may have a crystallinity of 95% or less. Thus, the crystallinity of the resin composition of this exemplary embodiment may be 65% or more and 95% or less, may be 70% or more and 95% or less, or may be 75% or more and 95% or less.

The crystallinity of the resin composition is measured as follows.

The crystallinity is measured with a differential scanning calorimeter (NEXTA DSC600 produced by Hitachi High-Tech Science Corporation). After the temperature is elevated at 20° C./hour from −15° C. to 200° C., the temperature is decreased at 10° C./hour from 200° C. to −15° C. during which the heat absorption (Ham) of the biodegradable resin in an amorphous state is measured at the glass transition temperature. Here, the composition of the biodegradable resin in an amorphous state is assumed to be the same as the composition of the biodegradable resin contained in the resin composition to be measured. Moreover, the "amorphous state" refers to a state where, in differential scanning calorimetry (DSC), the half-width of the endothermic peak during the measurement at a temperature elevation rate of 10 (° C./min) exceeds 10° C., where the endothermic change has a stepwise profile, or where no clear endothermic peak is observed.

Next, the resin composition to be measured is measured under the same temperature elevation and decreasing conditions to measure the heat absorption (Hsa) at the glass transition temperature. Since the endotherm at the glass transition temperature disappears due to crystallization, the crystallinity is determined from (Equation 4) below.

$$\text{Crystallinity (\%)} = ((Ham-Hsa)/Ham) \times 100 \qquad \text{(Equation 4)}$$

Method for Manufacturing Resin Composition

Examples of the method for manufacturing a resin composition according to an exemplary embodiment include a method that involves mixing a biodegradable resin, cellulose particles, and, optionally, other components and then melt-kneading the resulting mixture; and a method that involves dispersing a biodegradable resin, cellulose particles, and, optionally, other components in a solvent. The melt-kneading may be carried out by any device, and examples of the device include twin screw extruders, Henschel mixers, Banbury mixers, single-screw extruders, multi-screw extruders, and co-kneaders.

Method for Manufacturing Cellulose Particles

The cellulose particles may be manufactured through a step of manufacturing a cellulose acylate-containing particle precursor (particle precursor manufacturing step), and a saponifying step.

Step of Manufacturing Cellulose Acylate-Containing Particle Precursor

A cellulose acylate-containing particle precursor is manufactured by one of the methods (1) to (5) below.

(1) A kneading-grinding method that involves kneading the components, and grinding and classifying the obtained kneaded product to obtain particulate matters.

(2) A dry manufacturing method that involves changing the shapes of the particulate matters obtained by the kneading-grinding method with mechanical impact or thermal energy to obtain particulate matters.

(3) An aggregation and coalescing method that involves mixing particle dispersions of the respective components, and aggregating and thermally fusing the particles in the dispersions to obtain particulate matters.

(4) A dissolution and suspension method that involves suspending, in an aqueous solvent, an organic solvent dissolving the components so as to obtain particulate matters containing the components.

(5) A kneading and dissolving method that involves kneading the components and a binder, extruding the resulting mixture into pellets, and stirring the obtained pellets in a solvent that dissolves only the binder.

Here, the same cellulose acylates as those described in the biodegradable resin above can be applied as the cellulose acylate.

Saponifying Step

Next, the cellulose acylate contained in the particle precursor is saponified.

By performing this step, the aliphatic acyl groups in the cellulose acylate are hydrolyzed, and as a result cellulose acylate is converted into cellulose.

The saponifying step is, for example, carried out by adding sodium hydroxide in a dispersion of the particle precursor, and stirring the dispersion.

Intermediate Layer Forming Step and Coating Layer Forming Step

When an intermediate layer and a coating layer is to be formed on a cellulose particle, an intermediate layer forming step and a coating layer forming step may be performed.

First, a water dispersion containing dispersed cellulose particles is prepared. Prior to preparing the water dispersion, the cellulose particles may be washed with an acid.

Next, the water dispersion containing dispersed cellulose particles and an aqueous solution containing a compound constituting the intermediate layer are mixed. As a result, an intermediate layer is formed (intermediate layer forming step).

Next, the water dispersion containing dispersed cellulose particles having intermediate layers formed thereon and an emulsion containing a compound constituting the coating layer are mixed. As a result, coating layers are formed (coating layer forming step).

Next, the cellulose particles having the intermediate layers and the coating layers thereon are taken out from the mixture. For example, the cellulose particles having the intermediate layers and the coating layers thereon are taken out by filtering the mixture. The obtained cellulose particles having the intermediate layers and the coating layers thereon may be washed with water. Subsequently, the cellulose particles having the intermediate layers and the coating layers thereon may be dried.

When only a coating layer is to be formed on a cellulose particle, the aforementioned "Intermediate layer forming step" is omitted, and only the coating layer forming step of mixing a water dispersion containing dispersed cellulose particles and an emulsion containing a compound constituting the coating layer is performed. As a result, cellulose particles having coating layers are obtained.

Resin Molded Body

A resin molded body according to an exemplary embodiment contains the resin composition of the exemplary embodiment. In other words, the resin molded body of the exemplary embodiment has the same composition as the resin composition of the exemplary embodiment.

A method for manufacturing a resin molded body according to an exemplary embodiment may be a method that involves injection-molding the resin composition of the exemplary embodiment from the viewpoint of shape flexibility.

The resin composition according to the exemplary embodiment contains cellulose particles having a sphericity of 0.9 or more. Thus, the resin composition exhibits higher flowability during injection molding, and the moldability is easily improved.

The cylinder temperature for injection molding is, for example, 160° C. or higher and 280° C. or lower and is preferably 180° C. or higher and 240° C. or lower. The mold temperature of the injection molding is, for example, 40° C. or higher and 90° C. or lower and is preferably 40° C. or higher and 60° C. or lower.

Injection molding may be performed by using a commercially available apparatus, for example, NEX500 produced by NISSEI PLASTIC INDUSTRIAL CO., LTD., NEX150 produced by NISSEI PLASTIC INDUSTRIAL CO., LTD., NEX7000 produced by NISSEI PLASTIC INDUSTRIAL CO., LTD., PNX40 produced by NISSEI PLASTIC INDUSTRIAL CO., LTD., or SE50D produced by Sumitomo Heavy Industries, Ltd.

The resin molded body of the exemplary embodiment may be formed by a different molding method. Examples of the different molding method include extrusion molding, blow molding, thermal press molding, calendar molding, coat molding, cast molding, dip molding, vacuum molding, and transfer molding.

The resin molded body of the exemplary embodiment is suitable for the usages such as electronic and electric appliances, office equipment, home electric appliances, automobile interior materials, toys, and containers. Examples of the specific usage of the resin molded body of the exemplary embodiment include casings of electronic and electric appliances and home electric appliances; various parts of electronic and electric appliances and home electric appliances; block assembly toys; plastic model kits; storage casings of CD-ROMs and DVDs; beverage bottles; food trays; wrapping materials; films; and sheets.

EXAMPLES

Examples that do not limit the present disclosure will now be described. In the description below, "parts" and "%" are on a mass basis unless otherwise noted.

Manufacturing or Preparing Cellulose Particles

Manufacturing Cellulose Particles CP1

Particle Precursor Manufacturing Step

In 870 parts of ethyl acetate, 130 parts of cellulose diacetate serving as cellulose acylate is completely dissolved to obtain a cellulose acylate solution. The resulting solution is added to an aqueous liquid containing 100 parts of calcium carbonate and 500 parts of pure water, and the resulting mixture is stirred for 3 hours (hereinafter, the stirring time from after mixing the cellulose acylate solution and the aqueous liquid is referred to as the "first stirring time") to obtain a dispersion. The dispersion is added to a solution containing 4 parts of carboxymethylcellulose (hereinafter may also be referred to as "CMC") and 200 parts of methyl ethyl ketone dispersed in 600 parts of pure water, the resulting mixture is stirred at 80° C. for 3 hours, and then ethyl acetate and methyl ethyl ketone are removed. Thereto, 10 parts of sodium hydroxide and 10 parts of diluted hydrochloric acid are added, and the residue is filtered and again dispersed in 900 parts of pure water to thereby obtain a particle precursor dispersion.

Saponifying Step

To 500 parts of the particle precursor dispersion, 17.5 parts of a 20% aqueous sodium hydroxide solution is added, and the resulting mixture is stirred at 30° C. for 6 hours. Hydrochloric acid is added to the saponified slurry to adjust the pH to 7, and filtration and washing are repeated until the electrical conductivity of the filtrate reaches 10 μs/cm or less to thereby obtain cellulose particles.

Manufacturing Cellulose Particles CP2 to CP17

Cellulose particles are manufactured as described in "Manufacturing cellulose particles CP1" above except that the type of cellulose acylate, the amount of calcium carbonate added, the first stirring time, the amount of carboxymethylcellulose (CMC) added, and the amount of sodium hydroxide added are changed as indicated in Table 1.

Manufacturing Coating Particles CP18 having Coating Layers

Particle Precursor Manufacturing Step and Saponifying Step

Cellulose particles are manufactured by performing the particle precursor manufacturing step and the saponifying step as described in "Manufacturing cellulose particles CP1".

Coating Layer Forming Step

A cellulose particle dispersion is prepared by mixing 100 parts of cellulose particles and 400 parts of ion exchange water. Next, 8 parts of calcium stearate (CALCIUM STEARATE SHOKUBUTSU produced by NOF CORPORATION), which is a linear saturated fatty acid metal salt serving as a compound constituting the coating layer, and 50 parts of pure water are stirred in a high-speed emulsifier to prepare a coating layer-forming emulsion.

All of the coating layer-forming emulsion is added to the cellulose particle dispersion, and the resulting mixture is stirred for 24 hours to form coating layers on the cellulose particles and obtain a dispersion of cellulose particles having coating layers.

The cellulose particles having coating layers are repeatedly filtered and washed until the electrical conductivity of the filtrate reaches 10 µs/cm or less to thereby obtain cellulose particles CP18 having coating layers.

Manufacturing Coating Cellulose Particles CP19 to CP21 having Coating Layers

Cellulose particles having coating layers are manufactured as described in "Manufacturing cellulose particles CP18 having coating layers" except that, in the coating layer-forming step, the type of compound constituting the coating layers is changed as indicated in Table 1.

Manufacturing Cellulose Particles CP22 having Intermediate Layers and Coating Layers Particle Precursor Manufacturing Step and Saponifying Step Cellulose particles are manufactured by performing the particle precursor manufacturing step and the saponifying step as described in "Manufacturing cellulose particles CP1".

Intermediate Layer Forming Step

A cellulose particle dispersion is prepared by mixing 100 parts of cellulose particles and 400 parts of ion exchange water. To the cellulose particle dispersion, 1 part of L-arginine (C-GRADE produced by AJINOMOTO CO., INC.), which is an arginine compound that constitutes the intermediate layer, is added, and the resulting mixture is stirred for 1 hour to form intermediate layers on the cellulose particles to obtain a dispersion of cellulose particles having intermediate layers.

Coating Layer Forming Step

Eight parts of calcium stearate (CALCIUM STEARATE SHOKUBUTSU produced by NOF CORPORATION), which is a linear saturated fatty acid metal salt serving as a compound constituting the coating layer, and 50 parts of pure water are stirred in a high-speed emulsifier to prepare a coating layer-forming emulsion.

All of the coating layer-forming emulsion is added to the dispersion of the cellulose particles having intermediate layers, and the resulting mixture is stirred for 24 hours to form coating layers on the intermediate layers and obtain a dispersion of cellulose particles having coating layers and intermediate layers.

The cellulose particles having intermediate layers and coating layers are repeatedly filtered and washed until the electrical conductivity of the filtrate reaches 10 µs/cm or less to thereby obtain cellulose particles CP22 having intermediate layers and coating layers.

Manufacturing Cellulose Particles CP23 to 26 having Intermediate Layers and Coating Layers Cellulose particles having intermediate layers and coating layers are manufactured as described in "Manufacturing cellulose particles CP22 having intermediate layers and coating layers" except that, in the intermediate layer forming step, the type of the compound constituting the intermediate layers is changed as indicated in Table 1.

Manufacturing Cellulose Particles CP201

Sheet-shaped wood pulp ("Blue Bear Ultra Ether" produced by Borregaard AS) is passed through a shredder ("MSX2000-IVP440F" produced by Meiko Shokai Co., Ltd.) into pulp chips. The obtained pulp chips are ground by a twin-screw extruder (TEX41SS produced by Toshiba Machine Co., Ltd.).

The ground pulp (50 g) is placed in a batch-type stirring vessel-type grinder ("Sand Grinder" produced by Igarashi Machine Production Co., Ltd., container volume: 800 mL, filled with 720 g of 5 mmΦ zirconia beads at a filling fraction of 25%, stirring blade diameter: 70 mm), and ground at a stirring rotation rate of 2000 rotations/min for 180 minutes while passing cooling water through a container jacket.

After the completion of the process, adhering pulp and other adhering matters are not observed on the walls and bottom of the stirring vessel-type grinder. The pulp obtained after the second grinding process is taken out from the stirring vessel-type grinder and is sifted through a screen with 75 µm openings; as a result, 45 g (90 mass % of the feed amount) of cellulose particles CP201 are obtained as the undersize.

Manufacturing Cellulose Particles CP202

Cellulose particles CP202 are obtained according to the process described in Example 4 of Japanese Unexamined Patent Application Publication No. 11-241009. The cellulose particles CP202 have no intermediate layers or coating layers.

Preparation of Cellulose Particles CP101 to CP104 and Cellulose Acylate Particles CP105

The cellulose particles and cellulose acylate particles described below are prepared.

Cellulose particles CP101: CELLULOBEADS D10 (cellulose particles containing cellulose as a main component, produced by DAITO KASEI KOGYO CO., LTD. Intermediate layers and coating layers are not present.)

Cellulose particles CP102: CELLFLOW C25 (cellulose particles containing cellulose as a main component, produced by JNC Corporation. Intermediate layers and coating layers are not present.)

Cellulose particles CP103: S-STM CELLULOBEADS D-5 (cellulose particles containing cellulose as a main component, produced by DAITO KASEI KOGYO CO., LTD. Intermediate layers are not present but coating layers containing magnesium stearate are present.)

Cellulose particles CP104: OTS-0.5A CELLULOBEADS D10 (cellulose particles containing cellulose as a main component, produced by DAITO KASEI KOGYO CO., LTD. Intermediate layers are not present but coating layers containing triethoxyoctylsilane are present.)

Cellulose acylate particles CP105: CELLFLOW TA25 (cellulose particles containing cellulose acetate propionate as a main component, produced by JNC Corporation. Intermediate layers and coating layers are not present.)

The manufacturing conditions of the manufactured or prepared cellulose particles and cellulose acylate particles described above, and the particle properties, namely, sphericity, average particle diameter, particle size distribution GSDv, and surface smoothness, are indicated in Table 1.

The sphericity, average particle diameter, particle size distribution GSDv, and surface smoothness in Table 1 are values measured by the following procedures.

Procedure for Measuring Sphericity in Table 1

The sphericity is calculated from (Equation 1): sphericity=(equivalent circle perimeter)/(perimeter) [(perimeter of a circle having the same projection area as the particle image)/(perimeter of projected image of particle)]. Specifically, the measurement is performed as follows.

First, cellulose particles to be measured are sampled by suction, allowed to form a flat flow, and imaged by instantaneous strobe light emission to capture particle images as still images; and then these particle images are analyzed by a flow-type particle image analyzer (FPIA-3000 produced by Sysmex Corporation) to determine the sphericity. The number of particles sampled for determining the sphericity is 3500.

Procedure for Measuring Average Particle Diameter in Table 1

The particle diameters of the cellulose particles are measured with a laser diffraction-scattering particle diameter distribution analyzer (Microtrac MT3300EX produced by MicrotracBEL Corp.), the cumulative distribution of the particle diameters is lotted on a volume basis from the small diameter side, and the particle diameter at 50% cumulation is determined as the average particle diameter.

Procedure for Measuring Particle Size Distribution GSDv in Table 1

The particle diameters of the cellulose particles are measured with an LS particle size distribution analyzer (Beckman Coulter LS13320 (produced by Beckman Coulter, Inc.)), the cumulative distribution of the particle diameters is plotted on a volume basis from the small diameter side, the particle diameter at 50% cumulation is defined as the number-average particle diameter D50v, and the particle diameter at 84% cumulation is defined as the number particle diameter D84v. Then, the particle size distribution GSDv is calculated from (Equation 2): $GSDv=(D84v/D50v)^{1/2}$.

Procedure for Measuring Surface Smoothness in Table 1

The cellulose particles are imaged with a scanning electron microscope (SEM) to obtain a SEM image (magnification: 5,000×) of the cellulose particles, and the smoothness M of each of the cellulose particles is calculated from (Equation 3) below. Next, the arithmetic average of the smoothness M of the arbitrarily selected 50 or more cellulose particles is assumed to be the surface smoothness. The closer the smoothness M is to 1, the smoother the surface of the cellulose particle.

$$M=(1-(S3)/(S2))\times 100 \quad \text{(Equation 3)}$$

In the equation above, S2 represents an area (projected area) of a cellulose particle in the image, and S3 represents a total of the "area outside a contour of a circle having the same projected area as S2 and inside the contour of the cellulose particle in the image" and the "area inside the contour of the circle having the same projected area as S2 and outside the contour of the cellulose particle in the image" when the cellulose particle in the image and the circle having the same projected area as S2 are superimposed on each other.

Here, the method for superimposing the cellulose particle in the image and the circle having the same projected area as S2 is as follows.

The cellulose particle in the image and the circle having the same projected area as S2 are superimposed in such a way that maximizes the area of the region where two images overlap (in other words, the area inside the contour of the circle having the same projected area as S2 and inside the contour of the cellulose particle in the image).

TABLE 1

| | Particle precursor manufacturing step | | | | | Coating layer forming | | Intermediate layer forming Compound | | Properties of particles | | | |
|---|---|---|---|---|---|---|---|---|---|---|---|---|---|
| Particle No. | Cellulose acylate Type | Calcium carbonate Parts by mass | First stirring time Hr | Amount of CMC added Parts by mass | Sodium hydroxide Parts by mass | Compound constituting coating layer Type | Parts by mass | constituting intermediate layer Type | Parts by mass | Sphericity — | Average particle diameter μm | Particle size distribution GSDv — | Surface smoothness % |
| CP1 | CA-1 | 100 | 3 | 4 | 10 | | | | | 0.98 | 4 | 1.45 | 80 |
| CP2 | CA-2 | 100 | 3 | 4 | 10 | | | | | 0.97 | 5 | 1.33 | 82 |
| CP3 | CA-3 | 100 | 3 | 4 | 10 | | | | | 0.98 | 4 | 1.45 | 78 |
| CP4 | CA-4 | 100 | 3 | 4 | 10 | | | | | 0.98 | 3 | 1.38 | 77 |
| CP5 | CA-5 | 100 | 3 | 4 | 10 | | | | | 0.98 | 4 | 1.39 | 77 |
| CP6 | CA-1 | 100 | 3 | 4 | 8 | | | | | 0.91 | 5 | 1.33 | 78 |
| CP7 | CA-1 | 100 | 3 | 4 | 6 | | | | | 0.88 | 4 | 1.39 | 78 |
| CP8 | CA-1 | 120 | 3 | 4 | 6 | | | | | 0.98 | 1.2 | 1.46 | 80 |
| CP9 | CA-1 | 130 | 3 | 4 | 6 | | | | | 0.99 | 0.8 | 1.45 | 79 |
| CP10 | CA-1 | 50 | 3 | 4 | 6 | | | | | 0.99 | 9.5 | 1.33 | 78 |
| CP11 | CA-1 | 30 | 3 | 4 | 6 | | | | | 0.98 | 11 | 1.32 | 78 |
| CP12 | CA-1 | 100 | 2.5 | 4 | 6 | | | | | 0.98 | 4 | 1.68 | 79 |
| CP13 | CA-1 | 100 | 2 | 4 | 6 | | | | | 0.97 | 4 | 1.72 | 79 |
| CP14 | CA-1 | 100 | 3 | 2.5 | 10 | | | | | 0.98 | 4 | 1.45 | 52 |
| CP15 | CA-1 | 100 | 3 | 2 | 10 | | | | | 0.97 | 4 | 1.44 | 48 |
| CP16 | CA-1 | 100 | 3 | 6 | 10 | | | | | 0.97 | 5 | 1.43 | 93 |
| CP17 | CA-1 | 100 | 3 | 8 | 10 | | | | | 0.98 | 3 | 1.45 | 99.2 |

TABLE 1-continued

| | Particle precursor manufacturing step | | | | | Coating layer forming | | Intermediate layer forming Compound | | Properties of particles | | | |
|---|---|---|---|---|---|---|---|---|---|---|---|---|---|
| | Cellulose acylate | Calcium carbonate | First stirring time | Amount of CMC added | Sodium hydroxide | Compound constituting coating layer | | constituting intermediate layer | | Spher-icity | Average particle diameter | Particle size distri-bution GSDv | Surface smooth-ness |
| Particle No. | Type | Parts by mass | Hr | Parts by mass | Parts by mass | Type | Parts by mass | Type | Parts by mass | — | μm | — | % |
| CP18 | CA-1 | 100 | 3 | 4 | 10 | ST-1 | 8 | | | 0.97 | 4 | 1.41 | 78 |
| CP19 | CA-1 | 100 | 3 | 4 | 10 | ST-2 | 8 | | | 0.96 | 3 | 1.38 | 79 |
| CP20 | CA-1 | 100 | 3 | 4 | 10 | ST-3 | 8 | | | 0.97 | 3 | 1.37 | 80 |
| CP21 | CA-1 | 100 | 3 | 4 | 10 | ST-4 | 8 | | | 0.97 | 4 | 1.37 | 79 |
| CP22 | CA-1 | 100 | 3 | 4 | 10 | ST-1 | 8 | AC-1 | 1 | 0.96 | 3 | 1.36 | 80 |
| CP23 | CA-1 | 100 | 3 | 4 | 10 | ST-1 | 8 | AC-2 | 1 | 0.97 | 2 | 1.33 | 78 |
| CP24 | CA-1 | 100 | 3 | 4 | 10 | ST-1 | 8 | AC-3 | 1 | 0.96 | 4 | 1.32 | 77 |
| CP25 | CA-1 | 100 | 3 | 4 | 10 | ST-1 | 8 | AC-4 | 1 | 0.97 | 3 | 1.32 | 78 |
| CP26 | CA-1 | 100 | 3 | 4 | 10 | ST-1 | 8 | AC-5 | 1 | 0.97 | 4 | 1.34 | 79 |
| CP201 | | | | | | | | | | 0.75 | 30 | 1.79 | 61 |
| CP202 | | | | | | | | | | 0.55 | 35 | 1.98 | 60 |
| CP101 | | | | CELLULOBEADS D10 | | | | | | 0.97 | 14 | 1.17 | 94 |
| CP102 | | | | CELLUFLOW C-25 | | | | | | 0.97 | 10 | 1.86 | 88 |
| CP103 | | | | S-STM CELLULOBEADS D-5 | | | | | | 0.97 | 10 | 1.86 | 56 |
| CP104 | | | | OTS-0.5A CELLULOBEADS D-10 | | | | | | 0.98 | 14 | 1.32 | 85 |
| CP105 | | | | CELLUFLOW TA25 (cellulose acylate particles) | | | | | | 0.98 | 12 | 1.94 | 88 |

In Table 1, underlines indicate items outside the exemplary embodiments.

The abbreviations in Table 1 are as follows.

Cellulose Acylate

CA-1: Cellulose diacetate, Daicel "L-50", number-average molecular weight: 58000

CA-2: Cellulose diacetate, Daicel "L-20", number-average molecular weight: 47000

CA-3: Cellulose diacetate, Eastman Chemical "CA398-6", number-average molecular weight: 35000

CA-4: Cellulose acetate propionate, Eastman Chemical "CAP482-20", number-average molecular weight: 75000

CA-5: Cellulose acetate butyrate, Eastman Chemical "CAB381-20", number-average molecular weight: 70000

Compound Constituting Coating Layers

ST-1: linear saturated fatty acid metal salt, calcium stearate: CALCIUM STEARATE SHOKUBUTSU produced by NOF CORPORATION ST-2: linear saturated fatty acid, behenic acid: "NAA-222S" produced by NOF CORPORATION ST-3: amino acid compound, lauroyllysine: "AMIHOPE LL" produced by AJINOMOTO CO., INC.

ST-4: carnauba wax: "CN-100" produced by SENKA corporation

Compound Constituting Intermediate Layers

AC-1: arginine compound, L-arginine: C-GRADE produced by AJINOMOTO CO., INC.

AC-2: polyamine compound, PEG-15 cocopolyamine: "Dehyquart H81" produced by BASF AC-3: polyamine compound, polylysine: "Polylysine 10" produced by ICHIMARU PHARCOS Co., Ltd.

AC-4: polyamine compound, polyethyleneimine: "EPOMIN P-1000" produced by Nippon Shokubai Co., Ltd.

AC-5: polyvinyl alcohol: "GOHSENOL N-300" produced by Mitsubishi Chemical Corporation Examples 1 to 43 and Comparative Examples 1 to 20

A biodegradable resin, cellulose particles, and other components in feed ratios indicated in Tables 2-1 to 2-3-2 are charged into a twin-screw extruder (TEX-41SS produced by Toshiba Machine Co., Ltd.), and the resulting mixture is kneaded at a cylinder temperature indicated in Tables 2-1 to 2-3-2. A strand (having a rope shape with a diameter of about 2 mm) in a molten state is discharged from an outlet port of the twin-screw extruder and passed through a water vessel to cool, and the cooled and solidified strand is inserted into a pelletizer and cut into a length of 5 mm so as to obtain pellets of the resin composition.

Evaluation

Evaluation of Biodegradability

While cooling with liquid nitrogen, the pellets are ground by using a grinding mill (M20 produced by IKA Japan) and sieved through a 50 μm mesh to obtain a powder having a particle diameter of 50 μm or less. This powder is used to evaluate the biodegradation ratio of the resin composition in activated sludge in 60 days by a method according to OECD 306F.

Evaluation of Heat Resistance

The pellets are dried at 70° C. for 4 hours or longer, and ISO 527-recommended dumbbell test specimens 1A are formed by an injection molding machine (NEX500 produced by NISSEI PLASTIC INDUSTRIAL CO., LTD.) at cylinder temperatures and mold temperatures indicated in Tables 2-1 to 2-3-2. The test specimens are used to measure thermal deformation temperatures at a 0.45 MPa load by the method according to ISO 75-2d using a thermal deformation temperature measuring instrument (HDT3 produced by Toyo Seiki Seisaku-sho, Ltd.).

The higher the thermal deformation temperature, the higher the heat resistance.

TABLE 2-1

| | Composition | | | | | | Resin composition | | | | | | Evaluation of biodegradability | | Evaluation of heat resistance | | |
|---|---|---|---|---|---|---|---|---|---|---|---|---|---|---|---|---|---|
| | Biodegradable resin | | Cellulose particles | | Other components | | Kneading conditions | Sphericity of cellulose particles | Average particle diameter of cellulose particles μm | Particle size distribution of cellulose particles GSDv | Surface smoothness of cellulose particles % | Cellulose content Mass % | Mass of cellulose particles/mass of biodegradable resin | Crystallinity | Biodegradation fraction % | Thermal deformation temperature ° C. | Cylinder temperature ° C. | Mold temperature ° C. |
| | Type | Parts by mass | Particle No. | Parts by mass | Type | Parts by mass | Cylinder temperature ° C. | | | | | | | | | | | |
| Example 1 | BG-1 | 100 | CP1 | 5 | | | 190 | 0.98 | 4.0 | 1.45 | 80 | 4.8 | 0.05 | 81 | 72 | 140 | 190 | 80 |
| Example 2 | BG-1 | 100 | CP1 | 10 | | | 190 | 0.97 | 4.0 | 1.46 | 80 | 9.1 | 0.1 | 80 | 75 | 149 | 190 | 80 |
| Example 3 | BG-1 | 100 | CP1 | 0.5 | | | 190 | 0.98 | 4.0 | 1.45 | 80 | 0.5 | 0.005 | 76 | 75 | 145 | 190 | 80 |
| Example 4 | BG-1 | 100 | CP1 | 50 | | | 190 | 0.96 | 4.0 | 1.49 | 78 | 33.3 | 0.5 | 75 | 75 | 149 | 190 | 80 |
| Example 5 | BG-1 | 100 | CP1 | 0.3 | | | 190 | 0.98 | 4.0 | 1.45 | 80 | 0.3 | 0.003 | 59 | 64 | 122 | 190 | 80 |
| Example 6 | BG-1 | 100 | CP1 | 53 | | | 190 | 0.97 | 4.0 | 1.55 | 75 | 34.6 | 0.53 | 59 | 66 | 125 | 190 | 80 |
| Example 7 | BG-1 | 100 | CP2 | 10 | | | 190 | 0.97 | 5.0 | 1.35 | 81 | 9.1 | 0.1 | 74 | 73 | 142 | 190 | 80 |
| Example 8 | BG-1 | 100 | CP3 | 10 | | | 190 | 0.97 | 4.0 | 1.47 | 78 | 9.1 | 0.1 | 75 | 72 | 144 | 190 | 80 |
| Example 9 | BG-1 | 100 | CP4 | 10 | | | 190 | 0.97 | 3.0 | 1.40 | 76 | 9.1 | 0.1 | 76 | 74 | 143 | 190 | 80 |
| Example 10 | BG-1 | 100 | CP5 | 10 | | | 190 | 0.97 | 4.0 | 1.40 | 75 | 9.1 | 0.1 | 75 | 75 | 142 | 190 | 80 |
| Example 11 | BG-1 | 100 | CP6 | 10 | | | 190 | 0.91 | 5.0 | 1.34 | 75 | 9.1 | 0.1 | 76 | 73 | 145 | 190 | 80 |
| Example 12 | BG-2 | 100 | CP1 | 10 | | | 150 | 0.98 | 4.0 | 1.45 | 80 | 9.1 | 0.1 | 75 | 85 | 110 | 150 | 60 |
| Example 13 | BG-3 | 100 | CP1 | 10 | | | 180 | 0.97 | 4.0 | 1.47 | 79 | 9.1 | 0.1 | 73 | 65 | 125 | 180 | 60 |
| Example 14 | BG-4 | 100 | CP1 | 10 | | | 260 | 0.96 | 4.0 | 1.46 | 78 | 9.1 | 0.1 | 71 | 62 | 128 | 260 | 60 |
| Example 15 | BG-5 | 100 | CP1 | 10 | | | 240 | 0.97 | 4.0 | 1.47 | 78 | 9.1 | 0.1 | 72 | 62 | 118 | 240 | 60 |

TABLE 2-1-continued

| | Composition | | | | | | Kneading conditions | Resin composition | | | | | | Evaluation of biodegradability | | Evaluation of heat resistance | | |
|---|---|---|---|---|---|---|---|---|---|---|---|---|---|---|---|---|---|---|
| | Biodegradable resin | | Cellulose particles | | Other components | | | Sphericity of cellulose particles | Average particle diameter of cellulose particles μm | Particle size distribution of cellulose particles GSDv | Surface smoothness of cellulose particles % | Cellulose particle content Mass % | Mass of cellulose particles/mass of biodegradable resin | Crystallinity | Biodegradation fraction % | Thermal deformation temperature °C | Cylinder temperature °C | Mold temperature °C |
| | Type | Parts by mass | Particle No. | Parts by mass | Type | Parts by mass | Cylinder temperature °C | | | | | | | | | | | |
| Example 16 | BG-6 | 100 | CP1 | 10 | | | 160 | 0.95 | 4.0 | 1.47 | 77 | 9.1 | 0.1 | 65 | 51 | 100 | 160 | 40 |
| Example 17 | BG-7 | 100 | CP1 | 10 | | | 200 | 0.96 | 4.0 | 1.49 | 75 | 9.1 | 0.1 | 64 | 50 | 110 | 200 | 60 |
| Example 18 | BG-1 | 100 | CP9 | 10 | | | 190 | 0.97 | 0.8 | 1.48 | 77 | 9.1 | 0.1 | 72 | 65 | 120 | 190 | 80 |
| Example 19 | BG-1 | 100 | CP10 | 10 | | | 190 | 0.99 | 9.5 | 1.36 | 75 | 9.1 | 0.1 | 75 | 75 | 146 | 190 | 80 |
| Example 20 | BG-1 | 100 | CP11 | 10 | | | 190 | 0.97 | 11.0 | 1.35 | 76 | 9.1 | 0.1 | 71 | 65 | 122 | 190 | 80 |
| Example 21 | BG-1 | 100 | CP12 | 10 | | | 190 | 0.98 | 4.0 | 1.68 | 77 | 9.1 | 0.1 | 76 | 75 | 145 | 190 | 80 |

TABLE 2-2

| | Composition | | | | | | Kneading conditions | Resin composition | | | | | | Evaluation of biodegradability | | Evaluation of heat resistance | | |
|---|---|---|---|---|---|---|---|---|---|---|---|---|---|---|---|---|---|---|
| | Biodegradable resin | | Cellulose particles | | Other components | | | Sphericity of cellulose particles | Average particle diameter of cellulose particles μm | Particle size distribution of cellulose particles GSDv | Surface smoothness of cellulose particles % | Cellulose particle content Mass % | Mass of cellulose particles/mass of biodegradable resin | Crystallinity | Biodegradation fraction % | Thermal deformation temperature °C | Cylinder temperature °C | Mold temperature °C |
| | Type | Parts by mass | Particle No. | Parts by mass | Type | Parts by mass | Cylinder temperature °C | | | | | | | | | | | |
| Example 22 | BG-1 | 100 | CP13 | 10 | | | 190 | 0.95 | 4.0 | 1.73 | 78 | 9.1 | 0.1 | 65 | 64 | 122 | 190 | 80 |
| Example 23 | BG-1 | 100 | CP14 | 10 | | | 190 | 0.98 | 4.0 | 1.47 | 51 | 9.1 | 0.1 | 75 | 74 | 143 | 190 | 80 |
| Example 24 | BG-1 | 100 | CP15 | 10 | | | 190 | 0.97 | 4.0 | 1.45 | 47 | 9.1 | 0.1 | 67 | 65 | 125 | 190 | 80 |

TABLE 2-2-continued

| | Composition | | | | | | Resin composition | | | | | | | Evaluation of biodegradability | Evaluation of heat resistance | | |
|---|---|---|---|---|---|---|---|---|---|---|---|---|---|---|---|---|---|
| | Biodegradable resin | | Cellulose particles | | Other components | | Kneading conditions | Sphericity of cellulose particles | Average particle diameter of cellulose particles µm | Particle size distribution of cellulose particles GSDv | Surface smoothness of cellulose particles % | Cellulose content Mass % | Mass of cellulose particles/mass of biodegradable resin | Crystallinity | Biodegradation fraction % | Thermal deformation temperature °C | Cylinder temperature °C | Mold temperature °C |
| | Type | Parts by mass | Particle No. | Parts by mass | Type | Parts by mass | Cylinder temperature °C | | | | | | | | | | | |
| Example 25 | BG-1 | 100 | CP16 | 10 | | | 190 | 0.97 | 5.0 | 1.45 | 92 | 9.1 | 0.1 | 76 | 72 | 145 | 190 | 80 |
| Example 26 | BG-1 | 100 | CP17 | 10 | | | 190 | 0.98 | 3.0 | 1.49 | 99.2 | 9.1 | 0.1 | 66 | 64 | 126 | 190 | 80 |
| Example 27 | BG-1 | 100 | CP18 | 10 | | | 190 | 0.96 | 4.0 | 1.44 | 76 | 9.1 | 0.1 | 80 | 78 | 152 | 190 | 80 |
| Example 28 | BG-1 | 100 | CP19 | 10 | | | 190 | 0.98 | 3.0 | 1.42 | 77 | 9.1 | 0.1 | 81 | 79 | 151 | 190 | 80 |
| Example 29 | BG-1 | 100 | CP20 | 10 | | | 190 | 0.95 | 3.0 | 1.39 | 78 | 9.1 | 0.1 | 81 | 78 | 153 | 190 | 80 |
| Example 30 | BG-1 | 100 | CP21 | 10 | | | 190 | 0.95 | 4.0 | 1.39 | 77 | 9.1 | 0.1 | 75 | 73 | 144 | 190 | 80 |
| Example 31 | BG-1 | 100 | CP22 | 10 | | | 190 | 0.94 | 3.0 | 1.40 | 80 | 9.1 | 0.1 | 86 | 85 | 165 | 190 | 80 |
| Example 32 | BG-1 | 100 | CP23 | 10 | | | 190 | 0.97 | 2.0 | 1.31 | 78 | 9.1 | 0.1 | 88 | 85 | 160 | 190 | 80 |
| Example 33 | BG-1 | 100 | CP24 | 10 | | | 190 | 0.96 | 4.0 | 1.31 | 76 | 9.1 | 0.1 | 87 | 84 | 163 | 190 | 80 |
| Example 34 | BG-1 | 100 | CP25 | 10 | | | 190 | 0.98 | 3.0 | 1.32 | 78 | 9.1 | 0.1 | 88 | 86 | 166 | 190 | 80 |
| Example 35 | BG-1 | 100 | CP26 | 10 | | | 190 | 0.95 | 4.0 | 1.37 | 78 | 9.1 | 0.1 | 81 | 78 | 152 | 190 | 80 |
| Example 36 | BG-1 | 100 | CP101 | 10 | | | 190 | 0.95 | 14.0 | 1.22 | 92 | 9.1 | 0.1 | 65 | 62 | 122 | 190 | 80 |
| Example 37 | BG-1 | 100 | CP102 | 10 | | | 190 | 0.94 | 10.0 | 1.94 | 85 | 9.1 | 0.1 | 67 | 61 | 121 | 190 | 80 |
| Example 38 | BG-1 | 100 | CP103 | 10 | | | 190 | 0.94 | 10.0 | 1.89 | 52 | 9.1 | 0.1 | 67 | 62 | 118 | 190 | 80 |
| Example 39 | BG-1 | 100 | CP104 | 10 | | | 190 | 0.94 | 14.0 | 1.35 | 83 | 9.1 | 0.1 | 65 | 63 | 121 | 190 | 80 |

TABLE 2-2-continued

| | Composition | | | | | | Kneading conditions | Resin composition | | | | | | | Evaluation of biodegradability | Evaluation of heat resistance | | |
|---|---|---|---|---|---|---|---|---|---|---|---|---|---|---|---|---|---|---|
| | Biodegradable resin | | Cellulose particles | | Other components | | Cylinder temperature °C. | Sphericity of cellulose particles — | Average particle diameter of cellulose particles μm | Particle size distribution of cellulose particles GSDv — | Surface smoothness of cellulose particles % | Cellulose content Mass % | Mass of cellulose particles/mass of biodegradable resin — | Crystallinity — | Biodegradation fraction % | Thermal deformation temperature °C. | Cylinder temperature °C. | Mold temperature °C. |
| | Type | Parts by mass | Particle No. | Parts by mass | Type | Parts by mass | | | | | | | | | | | | |
| Example 40 | BG-1 | 100 | CP1 | 10 | AD-1 | 15 | 180 | 0.97 | 4.0 | 1.48 | 79 | 8.0 | 0.1 | 75 | 80 | 120 | 180 | 60 |
| Example 41 | BG-1 | 100 | CP1 | 10 | AD-2 | 15 | 180 | 0.96 | 4.0 | 1.51 | 78 | 8.0 | 0.1 | 76 | 82 | 122 | 180 | 60 |
| Example 42 | BG-4 | 100 | CP1 | 10 | AD-1 | 15 | 240 | 0.96 | 4.0 | 1.47 | 78 | 8.0 | 0.1 | 65 | 75 | 110 | 240 | 40 |
| Example 43 | BG-4 | 100 | CP1 | 10 | AD-2 | 15 | 240 | 0.93 | 4.0 | 1.55 | 75 | 8.0 | 0.1 | 66 | 76 | 105 | 240 | 40 |

TABLE 2-3-1

| | Composition | | | | | | Kneading conditions |
|---|---|---|---|---|---|---|---|
| | Biodegradable resin | | Cellulose particles | | Other components | | Cylinder temperature °C. |
| | Type | Parts by mass | Particle No. | Parts by mass | Type | Parts by mass | |
| Comparative Example 1 | BG-1 | 100 | CP7 | 10 | | | 190 |
| Comparative Example 2 | BG-2 | 100 | CP7 | 10 | | | 150 |
| Comparative Example 3 | BG-3 | 100 | CP7 | 10 | | | 180 |
| Comparative Example 4 | BG-4 | 100 | CP7 | 10 | | | 260 |
| Comparative Example 5 | BG-5 | 100 | CP7 | 10 | | | 240 |
| Comparative Example 6 | BG-1 | 100 | CP105 | 10 | | | 190 |
| Comparative Example 7 | BG-1 | 100 | CP201 | 10 | | | 190 |
| Comparative Example 8 | BG-1 | 100 | CP202 | 10 | | | 190 |
| Comparative Example 9 | BG-2 | 100 | CP105 | 10 | | | 150 |
| Comparative Example 10 | BG-2 | 100 | CP201 | 10 | | | 150 |
| Comparative Example 11 | BG-2 | 100 | CP202 | 10 | | | 150 |
| Comparative Example 12 | BG-3 | 100 | CP105 | 10 | | | 180 |
| Comparative Example 13 | BG-3 | 100 | CP201 | 10 | | | 180 |
| Comparative Example 14 | BG-3 | 100 | CP202 | 10 | | | 180 |
| Comparative Example 15 | BG-4 | 100 | CP105 | 10 | | | 260 |
| Comparative Example 16 | BG-4 | 100 | CP201 | 10 | | | 260 |
| Comparative Example 17 | BG-4 | 100 | CP202 | 10 | | | 260 |
| Comparative Example 18 | BG-5 | 100 | CP105 | 10 | | | 240 |
| Comparative Example 19 | BG-5 | 100 | CP201 | 10 | | | 240 |
| Comparative Example 20 | BG-5 | 100 | CP202 | 10 | | | 240 |

TABLE 2-3-2

| | Resin composition | | | | | | | Evaluation of heat resistance | | | |
|---|---|---|---|---|---|---|---|---|---|---|---|
| | Sphericity of cellulose particles — | Average particle diameter of cellulose particles μm | Particle size distribution of cellulose particles GSDv — | Surface smoothness of cellulose particles % | Cellulose particle content Mass % | Mass of cellulose particles/ mass of biodegradable resin — | Crystallinity % | Evaluation of Biodegradation Biodegradability fraction % | Thermal deformation temperature °C. | Cylinder temperature °C. | Mold temperature °C. |
| Comparative Example 1 | 0.87 | 4.0 | 1.42 | 77 | 9.1 | 0.1 | 58 | 25 | 75 | 190 | 80 |
| Comparative Example 2 | 0.86 | 4.0 | 1.44 | 76 | 9.1 | 0.1 | 44 | 70 | Less than 30 | 150 | 60 |
| Comparative Example 3 | 0.85 | 4.0 | 1.43 | 75 | 9.1 | 0.1 | 45 | 40 | 40 | 180 | 60 |
| Comparative Example 4 | 0.86 | 4.0 | 1.45 | 76 | 9.1 | 0.1 | 43 | 25 | 85 | 260 | 60 |
| Comparative Example 5 | 0.85 | 4.0 | 1.40 | 76 | 9.1 | 0.1 | 57 | 25 | 67 | 240 | 60 |
| Comparative Example 6 | 0.98 | 12.0 | 1.94 | 88 | 9.1 | 0.1 | 58 | 22 | 60 | 190 | 80 |
| Comparative Example 7 | 0.75 | 30.0 | 1.79 | 61 | 9.1 | 0.1 | 58 | 20 | 65 | 190 | 80 |
| Comparative Example 8 | 0.55 | 35.0 | 1.98 | 60 | 9.1 | 0.1 | 57 | 20 | 62 | 190 | 80 |
| Comparative Example 9 | 0.98 | 12.0 | 1.94 | 88 | 9.1 | 0.1 | 45 | 70 | Less than 30 | 150 | 60 |
| Comparative Example 10 | 0.75 | 30.0 | 1.79 | 61 | 9.1 | 0.1 | 43 | 70 | Less than 30 | 150 | 60 |
| Comparative Example 11 | 0.55 | 35.0 | 1.98 | 60 | 9.1 | 0.1 | 41 | 70 | Less than 30 | 150 | 60 |
| Comparative Example 12 | 0.98 | 12.0 | 1.94 | 88 | 9.1 | 0.1 | 44 | 35 | 39 | 180 | 60 |
| Comparative Example 13 | 0.75 | 30.0 | 1.79 | 61 | 9.1 | 0.1 | 45 | 38 | 38 | 180 | 60 |
| Comparative Example 14 | 0.55 | 35.0 | 1.98 | 60 | 9.1 | 0.1 | 47 | 33 | 35 | 180 | 60 |
| Comparative Example 15 | 0.98 | 12.0 | 1.94 | 88 | 9.1 | 0.1 | 52 | 20 | 85 | 260 | 60 |
| Comparative Example 16 | 0.75 | 30.0 | 1.79 | 61 | 9.1 | 0.1 | 51 | 21 | 85 | 260 | 60 |
| Comparative Example 17 | 0.55 | 35.0 | 1.98 | 60 | 9.1 | 0.1 | 52 | 19 | 85 | 260 | 60 |
| Comparative Example 18 | 0.98 | 12.0 | 1.94 | 88 | 9.1 | 0.1 | 53 | 19 | 65 | 240 | 60 |
| Comparative Example 19 | 0.75 | 30.0 | 1.79 | 61 | 9.1 | 0.1 | 55 | 18 | 66 | 240 | 60 |
| Comparative Example 20 | 0.55 | 35.0 | 1.98 | 60 | 9.1 | 0.1 | 54 | 20 | 65 | 240 | 60 |

In Tables 2-3-1 and 2-3-2, underlines indicate items outside the exemplary embodiments of the resin composition.

The abbreviations in Tables 2-1 to 2-3-2 are as follows.

Biodegradable Resin
- BG-1: Polylactic acid, "Ingeo 3001D" produced by NatureWorks LLC
- BG-2: Copolymer of 3-hydroxybutyric acid and 3-hydroxyhexaonic acid, "Green Planet X151A" produced by KANEKA CORPORATION
- BG-3: Homopolymer of 3-hydroxybutyric acid, Aldrich
- BG-4: Cellulose diacetate, "L-50" produced by Daicel, number-average molecular weight: 58000
- BG-5: Cellulose acetate propionate, "CAP482-20" produced by Eastman Chemical, number-average molecular weight: 75000
- BG-6: Polybutylene succinate, "Bio-PBS" produced by Mitsubishi Chemical Corporation
- BG-7: Polycaprolactam, "Capa" produced by INGEVITY Other Components
- AD-1: Cardanol, "NX2026" produced by Cardolite
- AD-2: Dibasic acid ester mixture, "Daifatty 101" produced by DAIHACHI CHEMICAL INDUSTRY CO., LTD.

Resin Composition
- Cellulose particle content: The amount of the cellulose particles relative to the entire resin composition. Mass of cellulose particles/mass of biodegradable resin: the ratio of the mass of the cellulose particles to the mass of the biodegradable resin.

The aforementioned results indicate that the resin compositions of Examples have high biodegradability and heat resistance.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
A resin composition comprising:
a biodegradable resin; and
cellulose particles,
wherein the cellulose particles have a sphericity of 0.9 or more.

(((2)))
The resin composition described in (((1))), wherein the cellulose particles have an average particle diameter of 1 μm or more and less than 10 μm.

(((3)))
The resin composition described in (((2))), wherein the cellulose particles have an average particle diameter of 1 μm or more and 5 μm or less.

(((4)))
The resin composition described in any one of (((1))) to (((3))), wherein the cellulose particles have a particle size distribution GSDv of 1.7 or less.

(((5)))
The resin composition described in any one of (((1))) to (((4))), wherein the cellulose particles have a surface smoothness of 50% or more and 99% or less.

(((6)))
The resin composition described in any one of (((1))) to (((5))), further comprising coating layers that cover the cellulose particles,
wherein the coating layers contain at least one selected from the group consisting of linear saturated fatty acids, linear saturated fatty acid metal salts, and amino acid compounds.

(((7)))
The resin composition described in (((6))), further comprising intermediate layers disposed between surfaces of the cellulose particles and the coating layers,
wherein the intermediate layers contain at least one selected from the group consisting of arginine compounds and polyamine compounds.

(((8)))
The resin composition described in any one of (((1))) to (((7))), wherein the biodegradable resin contains at least one selected from the group consisting of polyhydroxyalkanoates and cellulose acylates.

(((9)))
The resin composition described in (((8))), wherein the polyhydroxyalkanoates are polylactic acid.

(((10)))
The resin composition described in any one of (((1))) to (((9))), wherein the cellulose particles account for 0.5 mass % or more and 34 mass % or less of the entire resin composition.

(((11)))
The resin composition described in any one of (((1))) to (((10))), wherein a ratio of a mass of the cellulose particles to a mass of the biodegradable resin (mass of cellulose particles/mass of biodegradable resin) is 0.005 or more and 0.5 or less.

(((12)))
A resin composition comprising:
a biodegradable resin; and
cellulose particles,
wherein the resin composition has a crystallinity of 60% or more.

(((13)))
A resin molded body comprising the resin composition described in any one of (((1))) to (((12))).

What is claimed is:

1. A resin composition comprising:
a biodegradable resin;
cellulose particles;
coating layers that cover the cellulose particles; and
intermediate layers disposed between surfaces of the cellulose particles and the coating layers,
wherein the cellulose particles have a sphericity of 0.9 or more,
wherein the coating layers contain at least one selected from the group consisting of linear saturated fatty acids, linear saturated fatty acid metal salts, and amino acid compounds, and
wherein the intermediate layers contain at least one selected from the group consisting of arginine compounds and polyamine compounds.

2. The resin composition according to claim 1, wherein the cellulose particles have an average particle diameter of 1 μm or more and less than 10 μm.

3. The resin composition according to claim 2, wherein the cellulose particles have an average particle diameter of 1 μm or more and 5 μm or less.

4. The resin composition according to claim 1, wherein the cellulose particles have a particle size distribution GSDv of 1.7 or less.

5. The resin composition according to claim 1, wherein the cellulose particles have a surface smoothness of 50% or more and 99% or less.

6. The resin composition according to claim 1, wherein the biodegradable resin contains at least one selected from the group consisting of polyhydroxyalkanoates and cellulose acylates.

7. The resin composition according to claim 6, wherein the polyhydroxyalkanoates are polylactic acid.

8. The resin composition according to claim 1, wherein the cellulose particles account for 0.5 mass % or more and 34 mass % or less of the resin composition.

9. The resin composition according to claim 1, wherein a ratio of a mass of the cellulose particles to a mass of the biodegradable resin (mass of cellulose particles/mass of biodegradable resin) is 0.005 or more and 0.5 or less.

10. A resin composition comprising:
a biodegradable resin;
cellulose particles;
coating layers that cover the cellulose particles; and
intermediate layers disposed between surfaces of the cellulose particles and the coating layers,
wherein the resin composition has a crystallinity of 60% or more,
wherein the coating layers contain at least one selected from the group consisting of linear saturated fatty acids, linear saturated fatty acid metal salts, and amino acid compounds, and
wherein the intermediate layers contain at least one selected from the group consisting of arginine compounds and polyamine compounds.

11. A resin molded body comprising the resin composition according to claim 1.

12. A resin molded body comprising the resin composition according to claim 2.

13. A resin molded body comprising the resin composition according to claim 3.

14. A resin molded body comprising the resin composition according to claim 4.

15. A resin molded body comprising the resin composition according to claim 5.

16. A resin molded body comprising the resin composition according to claim 6.

* * * * *